Inventor:
Norval P. Millar,
by Russell A. Warner
His Attorney.

Patented Apr. 24, 1951

2,550,492

UNITED STATES PATENT OFFICE 2,550,492

HALL EFFECT ALTERNATING CURRENT MEASURING APPARATUS

Norval P. Millar, Danvers, Mass., assignor to General Electric Company, a corporation of New York Application May 27, 1950, Serial No. 164,827

6 Claims. (Cl. 172—245)

My invention relates to the measurement of watts, volt-amperes, and power factor of alternating current circuits, and its object is to accomplish such measurements using simple, low cost apparatus.

In carrying my invention into effect, I energize a Hall plate unit in proportion to the current and voltage of the alternating current circuit to be metered, thereby to obtain an output which contains a direct current component proportional to watts and a second harmonic component which is proportional to volt-amperes. These components are segregated and measured in terms of watts and volt-amperes, and a measurement of their ratios is obtained in terms of power factor.

Figure 1:
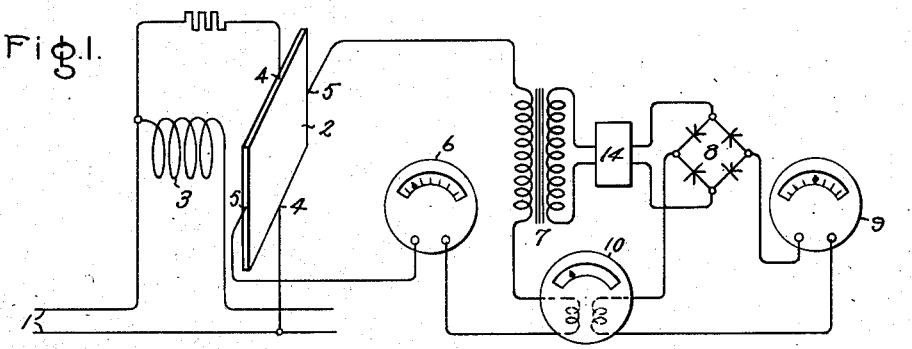
Figure 2:
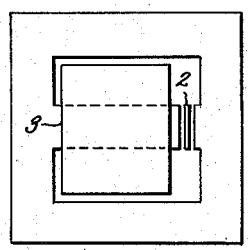
Figure 3:
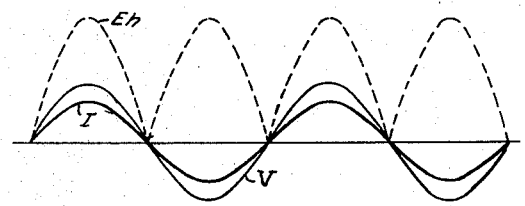
Figure 4:
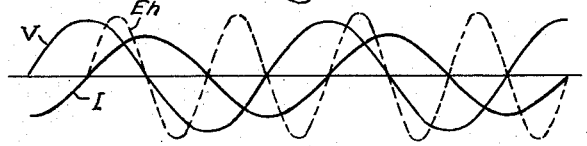
Figure 5:
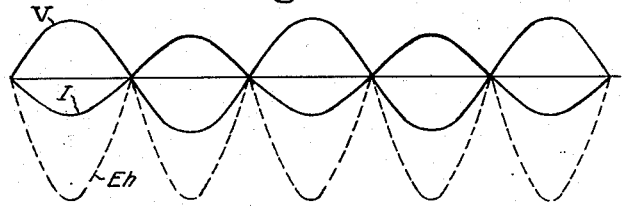
Figure 6:
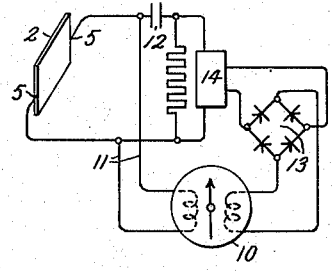
Figure 7:
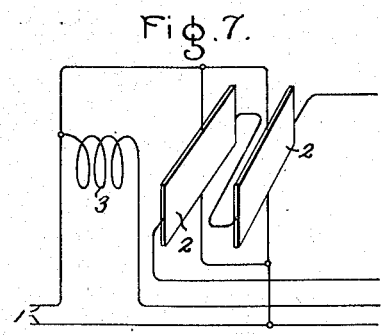

The features of my invention which are believed to be novel and patentable will be pointed out in the claims appended hereto. For a better understanding of my invention reference is made in the following description to the accompanying drawing in which Fig. 1 represents a wiring diagram of my Hall plate alternating current watt, volt-ampere and power factor measuring apparatus. Fig. 2 represents a preferred form of Hall plate and field excitation unit. Figs. 3, 4 and 5 are flux and current input curves and voltage output curves of a Hall plate at different power factors, to be referred to in explaining my invention. Fig. 6 represents a modification of Fig. 1 where only power factor is being measured. Fig. 7 shows how the Hall plate output energy may be increased by using a plurality of plates.

Referring to Fig. 1, 1 represents a single phase, alternating current power circuit, and the apparatus shown connected thereto has for its purpose the measurement of watts, volt-amperes and power factor of such circuit. At 2 is a Hall plate. At 3 is a coil energized in proportion to the current in the circuit 1 for producing an alternating field through the Hall plate at right angles to its plane. A current proportional to the voltage of the circuit 1 is passed through the plate edgewise through input terminals at 4, connected centrally of the upper and lower edges of the rectangular plate and connected across the line 1 through a dropping resistance as shown. The coil or winding 3 is preferably wound on a laminated magnetic core with the Hall plate contained in a narrow air gap of such core as represented in Fig. 2. The Hall plate may be made from germanium and have the following dimensions: ¼ x ¼ x .015 inch.

It is known that such an arrangement as has been described will produce a Hall plate voltage across the Hall plate 2 along an axis which is at right angles to both the field therethrough and the axis of the input current from terminals 4. Thus, a Hall voltage will be produced between output terminals connected as at 5. This output voltage will be proportional to the product of the field and input current at any given instant and will have a polarity dependent upon the relative polarity of field and input current at any instant.

Thus, in Fig. 3, let curve V represent the voltage of line 1 and the proportional current input to the Hall plate terminals 4, and let curve I represent the current flowing in line 1 and the proportional flux H through the Hall plate produced by winding 3. In Fig. 3 these curves are in phase, and the output from terminals 5 will be proportional to the product of V and I, and may be represented by the dotted line curve E$h$. Since the relative polarities of V and I do not change or since when one reverses, both reverse, E$h$ is all of one polarity and the average direct current value is proportional to watts. In Fig. 4 the corresponding curves of Fig. 3 have been plotted but with the current curve I lagging the voltage curve V by 90 degrees. The instantaneous output curve E$h$ now reverses in polarity with the relative reversal of V and I, and the average direct current value of curve E$h$ is zero.

In Fig. 5 the corresponding curves have been plotted but with the current curve I lagging curve V by 180 degrees. Here the output E$h$ has the same value as in Fig. 3 but is reversed in polarity. It is now apparent that if a sensitive direct current instrument 6 be connected in the output circuit of the Hall plate supplied from terminals 5 as in Fig. 1, such instrument may be calibrated with the apparatus to measure the watts of the circuit 1. In the case of Fig. 5 where the current and voltage are 180 degrees out of phase, the D.-C. instrument 6 would read backwards as compared to the in-phase condition of Fig. 3, and if not of the zero-center type would need to be reversed to measure the power flow in opposite directions in the circuit 1.

It will be noted that in Figs. 3, 4 and 5 in all cases there exists a time varying alternating component in the output of twice the frequency of the waves V and I. In other words, the curve E$h$ has a second harmonic component which, of course, does not influence the direct current instrument, and this second harmonic component exists even when the direct current component is zero. If the curves V and I are sine waves in the three cases plotted and have the same values for each case, and curve E$h$ is accurately plotted to the same scale in Figs. 3, 4 and 5, it will be found that the value of the second harmonic component is the same in each figure and is proportional to the alternating current volt-amperes of the circuit 1 and is independent of power factor. This second harmonic current component is segregated by means of a suitable alternating current energy transfer device, such as a transformer 7, preferably rectified by a fullwave rectifier 8 and measured by a sensitive direct current instrument 9 calibrated with the apparatus to measure the volt-amperes of line 1.

The mathematical proof that such second harmonic current is proportional to volt-amperes is as follows: The basic equation for Hall plate output voltage $Eh$ is:

$$Eh = KHIp \tag{1}$$

where
H is the field flux through the plate,
$Ip$ is the current input to the Hall plate at terminals 4,
K is a constant of proportionality.

Let the instantaneous values of voltage and current of line 1 be, $$v = Vm \sin wt \tag{2}$$

and $$i = Im \sin (wt + \theta) \tag{3}$$

where $Vm$ and $Im$ are peak values of $v$ and $i$, respectively, $w$=radian frequency=$2\pi f$,
$f$=frequency in cycles per second,
$t$=time in seconds,
$\theta$=phase angle between V and I.

Since in Equation 1 H and $Ip$ are proportional to $i$ and $v$, respectively, such equation may be rewritten in terms of Equations 2 and 3 as follows:

$$Eh = KVmIm \sin wt \sin (wt + \theta) \tag{4}$$

From trigonometry $$\sin(wt + \theta) = \sin wt \cos \theta + \cos wt \sin \theta \tag{4a}$$

Substituting (4a) into (4)

$$Eh = KVmIm (\sin^2 wt \cos \theta + \sin wt \cos wt \sin \theta) \tag{4b}$$

From trigonometry $$\sin^2 wt = \tfrac{1}{2}(1 - \cos 2wt) \tag{4c}$$

and $$\sin wt \cos wt = \tfrac{1}{2} \sin 2wt \tag{4d}$$

Substituting (4c) and (4d) into (4b), we get $$Eh = K \frac{VmIm}{2}[(1 - \cos 2wt) \cos \theta + \sin 2wt \sin \theta] \tag{4e}$$

$$Eh = K \frac{VmIm}{2}[\cos \theta - (\cos 2wt \cos \theta - \sin 2wt \sin \theta)] \tag{4f}$$

From trigonometry we recognize that $$(\cos 2wt \cos \theta - \sin 2wt \sin \theta) = \cos(2wt + \theta) \tag{4g}$$

Hence, $$Eh = K \frac{VmIm}{2}[\cos - \cos(2wt + \theta)] \tag{4h}$$

The root mean square values of V and I are $$\frac{Vm}{\sqrt{2}} \text{ and } \frac{Im}{\sqrt{2}}$$

respectively, and hence, $$\frac{Vm}{\sqrt{2}} \times \frac{Im}{\sqrt{2}} = \frac{VmIm}{2} = VI \tag{4i}$$

Substituting (4i) into (4h)

$$Eh = K[VI \cos \theta - VI \cos(2wt + \theta)] \tag{5}$$

In Equation 5 the term $VI \cos \theta$ is the D.-C. watt component output of the Hall plate which is measured by instrument 6, and the term $VI \cos(2wt + \theta)$ is the second harmonic current component output of the Hall plate and is measured by instrument 9. In the latter term the product of volts times amperes or VI is the amplitude of the cosine time varying second harmonic wave, and hence is independent of the phase angle $\theta$.

The direct current component flowing in the instrument 6 is proportional to $VI \cos \theta$, and the direct current flowing in the instrument 9 is proportional to VI. The ratio of these currents will then be proportional to the power factor of the circuit 1, thus $$\frac{VI \cos \theta}{VI} = \cos \theta = \text{power factor}$$

Hence, I provide a direct current ratio meter for measuring the ratio between the watt component current and the volt-ampere component current calibrated with the apparatus in terms of the power factor of the circuit 1. Thus, where the condition is that corresponding to Fig. 3, instruments 6 and 9 will read alike, and instrument 10 will read unity power factor; and for the condition represented in Fig. 4, instrument 6 will read zero, instrument 9 will read the same as for the condition of Fig. 3, assuming that only the phase angle $\theta$ has changed, and instrument 10 will read zero power factor, and no direct current will flow in watt circuit ratio coil of the instrument 10.

It is, of course, possible to omit any one or more of the three instruments and corresponding measurements with possible circuit simplification. Thus, Fig. 6 represents Hall plate output connections that may be used where only the power factor is to be measured. Here the direct current component of the Hall plate output is confined to the circuit 11 by a condenser 12 and resistance, while the second harmonic current component is allowed to pass through by capacitance-resistance coupling and is rectified by a rectifier at 13. The ratio of these current components is then measured by the D.-C. ratio instrument 10, calibrated with the apparatus in terms of power factor. Where necessary or desirable, an amplifier may be used for the second harmonic current as represented at 14 in Fig. 1. The Hall plate output energy available can also be increased by using additional Hall plates. Thus, Fig. 7 shows how the output voltage may be doubled.

Best power output from the Hall plate is obtained when the Hall plate output load resistance matches the resistance of the Hall plate, and for the Hall plate previously mentioned herein this is about 60 ohms. With a 500 watt unity power factor load on line 1, a Hall plate field of 4500 gauss, and a Hall plate input current of 0.06 ampere, the Hall plate output will be of the following order or better without using amplifiers: D.-C. voltage 0.058; D.-C. load current 1.16 milliamperes; D.-C. load power 67 microwatts; A.-C. voltage 0.040; A.-C. load current 0.80 milliampere; A.-C. load power 32 microwatts.

It is seen that the apparatus used is simple and inexpensive, the power expenditure for measurement purposes is small, and the apparatus takes advantage of the high sensitivity of conventional direct current measuring instruments.

What I claim as new and desire to secure by Letters Patent of the United States is:

1. In a measuring system apparatus for obtaining direct and alternating currents proportional to the watts and volt-amperes respectively of an alternating current circuit, comprising a Hall plate, a winding for producing a flux through said plate and input terminals for passing current through said plate in such relations as to produce a Hall voltage at output terminals on said plate proportional to the product of such flux and current, energizing circuits for said winding and input terminals one of which circuits is energized in proportion to the current and the other of which is energized in proportion to the voltage of an alternating current circuit, a circuit which is supplied from the output terminals of said plate and alternating current energy transfer means associated with said output circuit for segregating the second harmonic current component flowing therein.

2. Apparatus for measuring the volt-amperes of an alternating current circuit, comprising a Hall plate unit having current input terminals and electromagnetic means for producing a flux field for said unit, energizing circuits for said input terminals and electromagnet one of which circuits is energized in proportion to the voltage and the other of which is energized in proportion to the current of an alternating current circuit, said unit having output terminals across which a voltage is produced proportional to the product of the instantaneous field and input current of said Hall plate unit, an alternating current energy transfer device energized from said output terminals for obtaining an alternating current proportional to the volt-amperes of such alternating current circuit and a rectifier type of direct current measuring instrument connected for obtaining a measurement of such alternating current in terms of volt-amperes.

3. Apparatus for measuring the power factor of an alternating current circuit, comprising a Hall plate unit having current input terminals and electromagnetic means for producing the flux for such unit, energizing circuits for said input terminals and electromagnetic means one of which circuits is energized in proportion to the voltage and the other of which is energized in proportion to the current of an alternating current circuit, said Hall plate unit having output terminals across which a voltage is produced which is proportional to the product of instantaneous field and input current of said Hall plate unit and which has a direct current component proportional to the watts and an alternating current component proportional to the volt-amperes of such alternating current circuit, means energized from said output terminals for obtaining an alternating current corresponding to said alternating current component, means for rectifying said alternating current and a direct current ratio instrument connected to be energized from said output terminals and by said rectified current for obtaining a measurement of the ratio between said two components in terms of the power factor of such alternating current circuit.

4. Measuring apparatus for alternating current circuits, comprising a Hall plate unit having a field and input current terminals, energizing circuits therefor, one of said circuits being connected to be energized in proportion to the current and the other of said circuits being connected to be energized in proportion to the voltage of an alternating current circuit, output terminals for said Hall plate unit, a transformer having primary and secondary windings, the primary winding being energized from said output terminals, a direct current instrument energized with the primary winding of said transformer and calibrated with the apparatus to measure the watts of said alternating current circuit, and a rectifier type of direct current instrument energized from the secondary of said transformer and calibrated with said apparatus to measure the volt-amperes of said alternating current circuit.

5. Alternating current measuring apparatus, comprising a Hall plate unit having current input terminals and field winding means, energizing circuits therefor, one circuit to be energized in proportion to the voltage and the other circuit to be energized in proportion to the current of an alternating current circuit, output terminals for said Hall plate unit across which a voltage proportional to the product of the instantaneous field and input current of said Hall plate unit is produced when energized as contemplated, a measuring instrument energized from said output terminals, said instrument being responsive only to the direct current component of said output voltage and calibrated with the apparatus in terms of the watts, another measuring instrument calibrated in terms of volt-amperes, a connection between said last mentioned instrument and output terminals and energy transferring means which passes only alternating current included in said connection.

6. Measuring apparatus comprising a Hall plate unit, said unit having current input terminals and electromagnetic means for producing a flux field, circuits for energizing said input terminals and said electromagnetic means in proportion to the voltage and current of an alternating current circuit, output terminals for said Hall plate unit across which there is produced an output voltage having a direct current component proportional to the watts and a second harmonic alternating current component proportional to the volt-amperes of such alternating current circuit, energy converting means connected to said terminals for converting only such second harmonic component into a proportional direct current, and a direct current ratio instrument connected to said output terminals and to said energy converting means for measuring the ratio between said direct current component and said direct current in terms of the power factor of such alternating current circuit.

NORVAL P. MILLAR.

No references cited.